2,945,055

ORGANIC COMPOUNDS CONTAINING PHOSPHORUS AND SULPHUR

Henry Tolkmith, Midland, Mich., assignor to The Dow Chemical Company, Midland, Mich., a corporation of Delaware No Drawing. Filed Oct. 27, 1958, Ser. No. 769,580

6 Claims. (Cl. 260—461)

This invention relates to organic compounds containing phosphorus and sulphur, and is more particularly concerned with 1,2-bis(phosphinothioyl)hydrazines and a method for their preparation.

The compounds of this invention have the formula:

$$\begin{array}{c} R' \\ \diagdown \\ R' \end{array} \!\!\! \begin{array}{c} S \\ \| \\ P-NH-NH-P \end{array} \!\!\! \begin{array}{c} S \\ \| \\ \diagup \\ R \end{array} \!\!\! \begin{array}{c} R \\ \diagup \\ R \end{array}$$

(Formula I)

wherein R and R' may be alkoxy radicals containing up to 4 carbon atoms or dialkylamino radicals wherein the alkyl groups contain up to 4 carbon atoms each, and wherein R and R' have different values. Thus, while the R's have the same value and the R"s have the same value, the R's and R"s must have different values. The compounds of the present invention may therefore be considered to be unsymmetrical.

The compounds of the present invention are colorless, crystalline solids somewhat soluble in many organic compounds. They have been found to be active insecticides and fungicides and are adapted to be employed as active toxic constituents in dust and liquid compositions for the control of insects and fungi, such as, for example, the southern army worm and tomato or potato late blight.

The new compounds may be readily prepared by reacting together (1) a phosphinothioylhydrazine and (2) a phosphinothioyl halide as shown in the following equation:

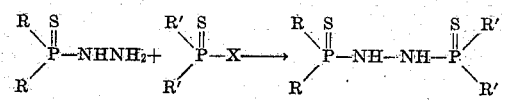

wherein R and R' have the values previously assigned, except that R and R' for the purposes of the process of the present invention may have the same or different values, and X is a halogen having an atomic number between 8 and 54. Thus, the halogen may be fluorine, chlorine, bromine or iodine, although chlorine is preferred. A smooth reaction takes place in a temperature range of 0° to 50° C. with the production of the desired di-substituted hydrazine. Pyridine, trimethylamine, triethylamine, tripropylamine and the like may be employed to act as hydrogen halide acceptors, thus resulting in higher yields.

Phosphinothioylhydrazines may be prepared by contacting hydrazine hydrate with a suitable phosphinothioyl chloride. The reaction taking place may be represented by the following equation:

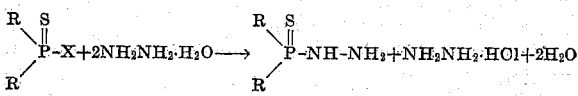

wherein R has the hereinbefore assigned values. A satisfactory temperature range for the reaction is 20° to 30° C. and the mixture should be agitated during the entire reaction period, usually from 2 to 24 hours. Separation of the desired phosphinothioylhydrazine is not required since the reaction mixture, after separation of the aqueous layer, if present, may be used directly for the reaction of the present invention.

In carrying out the reaction of the present invention, a solution of a phosphinothioylhydrazine in a solvent which is substantially non-reactive under the conditions of the reaction is provided. Suitable solvents for the practice of the invention are, for example, benzene, toluene, xylene, chloroform, carbon tetrachloride, diethyl ether, dipropyl ether and petroleum ether; the boiling point of the solvent should be above the temperature of the reaction, yet low in order to facilitate removal when the reaction has been completed. A similar solution of phosphinothioyl halide is added slowly to the solution of phosphinothioylhydrazine at a temperature of 0°–50° C., desirably 10° to 40° C., and preferably 20° to 30° C., maintained for the duration of the reaction. After addition of the phosphinothioyl halide solution has been completed, the reaction mixture may be filtered to remove insoluble materials and the organic solvents thereafter removed. Upon evaporation of the solvent, the desired product appears as white crystals.

The following examples illustrate the invention, but are not to be construed as limiting the invention thereto.

PREPARATION OF 1-BIS(DIMETHYLAMINO)-PHOSPHINOTHIOYLHYDRAZINE

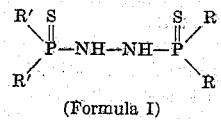

An agitated solution of 4 moles of hydrazine hydrate in 100 milliliters of benzene was maintained at 20° to 30° C. for a period of 24 hours during which time a solution of 0.5 mole of bis(dimethylamino)phosphinothioyl chloride was added dropwise. The aqueous layer formed during the reaction was discarded and the remaining benzene layer was evaporated leaving a solid residue of 78 grams. On recrystallization of this solid residue from diethyl ether, 73 grams (80 percent of theoretical based on bis(dimethylamino)phosphinothioyl chloride) of bis(dimethylamino)phosphinothioylhydrazine, melting over the range of 39° to 40° C. were obtained.

| Analysis | Percent Nitrogen | Molecular Weight |
|---|---|---|
| Calculated | 30.71 | 182.2 |
| Found | 30.14 | 190 |

In a manner similar to that of the foregoing preparation, other phosphinothioylhydrazines may be prepared, such as, for example: bis(diethylamino)phosphinothioylhydrazine; bis(dipropylamino)phosphinothioylhydrazine; bis(disbutylamino)phosphinothioylhydrazine.

*Example I*

1-[BIS(DIMETHYLAMINO)PHOSPHINOTHIOYL]-2-(DIETHOXYPHOSPHINOTHIOYL)HYDRAZINE $$\begin{array}{c} (CH_3)_2N \\ \diagdown \\ (CH_3)_2N \end{array} \!\!\! \begin{array}{c} S \\ \| \\ P-NH-NH-P \end{array} \!\!\! \begin{array}{c} S \\ \| \\ \diagup \\ OC_2H_5 \end{array} \!\!\! \begin{array}{c} OC_2H_5 \\ \diagup \\ OC_2H_5 \end{array}$$

An agitated solution of 0.186 mole [bis(dimethylamino)phosphinothioyl]hydrazine, 0.202 mole of pyridine in 100 milliliters of benzene was maintained at 20° to 30° C. for a period of 2 hours, during which time a solution of 0.186 mole of diethoxyphosphinothioyl chloride in 200 milliliters of benzene was added thereto dropwise. The reaction mixture was filtered, the solid pyridine salt washed with diethyl ether, and again filtered. The filtrates were combined and evaporated to remove the ether, in this operation a solid residue was obtained which was recrystallized from cyclohexanone. There was thus obtained 35 grams of white crystalline 1-[bis(dimethylamino)phosphinothioyl] - 2 - (diethoxyphosphinothioyl)hydrazine, melting over the range 100° to 102° C.

| Analysis | Molecular Weight | Percent Nitrogen |
|---|---|---|
| Calculated | 334.38 | 15.76 |
| Found | 344 | 15.81 |

| Analysis | Percent Phosphorus | Percent Sulphur |
|---|---|---|
| Calculated | 18.53 | 19.18 |
| Found | 18.69 | 19.60 |

PREPARATION OF (DIMETHOXYPHOSPHINOTHIOYL)HYDRAZINE

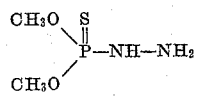

An agitated solution of 2 moles of dimethoxyphosphinothioyl chloride in 1200 milliliters of benzene was maintained at 25° to 30° C. for a period of 20 hours, during which time 4 moles of hydrazine hydrate were added dropwise. The aqueous layer was separated and the benezene layer containing (dimethylphosphinothioyl) hydrazine was used in Example II in the preparation of 1-(dimethoxyphosphinoethioyl) - 2 - (diethoxyphosphinothioyl)hydrazine without further operation.

In a manner similar to that of the foregoing preparation, other phosphinothioylhydrazines may be prepared, such as, for example: bis(diethoxy)phosphinothioylhydrazine; bis(dipropoxy)phosphinothioylhydrazine; bis-(dibutoxy)phosphinothioylhydrazine.

*Example II*

1—(DIMETHOXYPHOSPHINOTHIOYL)—2—(DIETHOXYPHOSPHINOTHIOYL)—HYDRAZINE

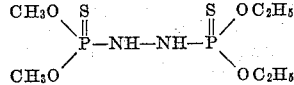

To the previously prepared benzene layer was added 1.8 moles of triethylamine; this solution was agitated and maintained at a temperature of 25° to 30° C. for a period of 24 hours during which time 1.75 moles of diethoxyphosphinothioyl chloride were added dropwise. The triethylamine hydrochloride formed during the reaction was discarded and the remaining benzene layer was evaporated leaving a semi-solid residue. This crude product was recrystallized from cyclohexane and again from ether. There was thus obtained a colorless, crystalline 1-(dimethoxyphosphinothioyl) - 2 - (diethoxyphosphinothioyl)hydrazine, melting over the range 47° to 48° C., whose structure was confirmed by infra-red analysis.

While the phosphinothioyl halide has been generally shown as a chloride, it is to be understood that phosphinothioyl fluorides, bromides and iodides may be employed similarly.

In a manner similar to that of the foregoing examples, other phosphinothioylhydrazines may be prepared from suitable phosphinothioyl halides and phosphinothioylhydrazines of which the following hydrazines are representative:

1-[bis(dimethylamino)phosphinothioyl] - 2 - (dimethoxyphosphinothioyl)hydrazine;
1-[bis(dimethylamino)phosphinothioyl] - 2 - (dipropoxyphosphinothioyl)hydrazine;
1-[bis(dimethylamino)phosphinothioyl] - 2 - (dibutoxyphosphinothioyl)-hydrazine;
1-[bis(diethylamino)phosphinothioyl] - 2 - (dimethoxyphosphinothioyl)hydrazine;
1-[bis(diethylamino)phosphinothioyl] - 2 - (diethoxyphosphinothioyl)hydrazine;
1 - [bis(ethylamino)phosphinothioyl] - 2 - (dipropoxyphosphinothioyl)hydrazine;
1 - [bis(diethylamino)phosphinothioyl] - 2 - (dibutoxyphosphinothioyl)hydrazine;
1-[bis(dipropylamino)phosphinothioyl] - 2 - (dimethoxyphosphinothioyl)hydrazine;
1-[bis(dipropylamino)phosphinothioyl] - 2 - (diethoxyphosphinothioyl)hydrazine;
1-[bis(dipropylamino)phosphinothioyl] - 2 - (dipropoxyphosphinothioyl)hydrazine;
1-[bis(dipropylamino)phosphinothioyl] - 2 - dibutoxyphosphinothioyl)hydrazine;
1-[bis(dibutylamino)phosphinothioyl] - 2 - (dimethoxyphosphinothioyl)hydrazine;
1 - [bis(dibutylamino)phosphinothioyl]-2-(diethoxyphosphinothioyl)hydrazine;
1-[bis(dibutylamino)phosphinothioyl] - 2 - (dipropoxyphosphinothioyl)hydrazine;
1 - [bis(dibutylamino)phosphinothioyl]-2-(dibutoxyphosphinothioyl)hydrazine;
1,2-[bis(dimethoxyphosphinothioyl)]hydrazine;
1-(dimethoxyphosphinothioyl) - 2 - (propoxyphosphinothioyl)hydrazine - 1 - (dimethoxyphosphinothioyl)-2-(dibutoxyphosphinothioyl)hydrazine;
1,2-bis(diethoxyphosphinothioyl)hydrazine;
1 - (diethoxyphosphinothioyl) - 2 - (dipropoxyphosphinothioyl)hydrazine;
1 - (diethoxyphosphinothioyl) - 2 - (dibutoxyphosphinothioyl)hydrazine;
1,2-bis(dipropoxyphosphinothioyl)hydrazine;
1-(dipropoxyphosphinothioyl) - 2 - (dibutoxyphosphinothioyl)hydrazine;
1,2-bis(dibutoxyphosphinothioyl)hydrazine.

The bis(phosphinothioyl)hydrazines of the present invention are valuable as parasiticides and are adapted to be employed for the control of insect and fungal organisms, such as, for example, southern army worms and tomato or potato late blight. For such use, the products may be dispersed on an inert finely divided solid and employed as dusts. Such mixtures may also be dispersed in water with and without the aid of a wetting agent and the resulting aqueous suspensions employed as sprays. In other procedures, the products may be employed as active toxic constituents in oil in water emulsions or aqueous dispersions with or without the addition of wetting. dispersing or emulsifying agents. The resulting mixtures may be employed directly to contact the organism to accomplish control thereof.

In a representative operation, 1 part of 1-bis(dimethylamino)phosphinothioyl - 2 - (diethoxyphosphinothioyl)-hydrazine was dispersed in 500 parts of water and one-half of a group of bean plants were wetted with this dispersion. After the visible surface moisture had evaporated from the bean plants, all plants in the group are infected with southern army worm larvae. After a lapse of three days, the plants and larvae are examined. It is found that larvae placed on untreated plants are alive while those placed on the plants treated with the 1-[bis-(dimethylamino)phosphinothioyl]-2-(diethoxyphosphinothioyl)hydrazine dispersion are dead. A similar dispersion of 1 part 1-(dimethoxyphosphinothioyl)-2-(diethoxyphosphinothioyl)hydrazine in 500 parts of water was applied to cranberry bean plants infected with two-spotted spider mites and after a period of 3 days a commercial kill of the spider mites was obtained.

Various modifications may be made in the present invention without departing from the spirit or scope thereof, and it is to be understood that I limit myself only as defined in the appended claims.

What is claimed is:

1. Bis(phosphinothioyl)hydrazines having the formula:

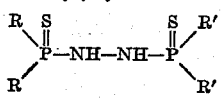

wherein R is an alkoxy radical containing up to 4 carbon atoms and R' is selected from the group consisting of alkoxyl radicals and dialkylamino radicals each alkyl and alkoxy group containing up to 4 carbon atoms and R and R' have different values.

2. Bis(phosphinothioyl)hydrazines having the formula:

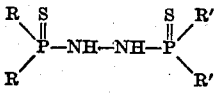

wherein R is an alkoxy radical and R' is a dialkylamino radical, wherein the alkyl groups will contain up to 4 carbon atoms and R and R' have different values.

3. 1 - (alkoxyphosphinothioyl) - 2 - (alkoxyphosphinothioyl)hydrazines having the formula:

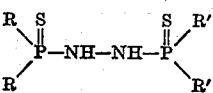

wherein R and R' are alkoxyl radicals containing up to 4 carbon atoms each and R and R' have different values.

4. 1-bis(dimethylamino)phosphinothioyl-2 - (diethoxyphosphinothioyl)hydrazine having the formula:

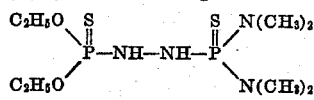

5. 1 - (dimethoxyphosphinothioyl) - 2 - (diethoxyphosphinothioyl)hydrazine having the formula:

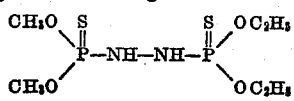

6. A method for the preparation of 1-[bis(dialkylamino) phosphinothioyl] - 2 - dialkoxyphosphinothioyl)-hydrazines having the formula:

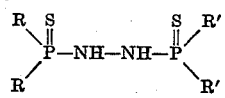

wherein R is an alkoxy radical containing up to 4 carbon atoms, R' is a diakylamino radical wherein the alkyl groups contain up to 4 carbon atoms, the steps of which comprise providing a solution of a bis(dialkylamino)-phosphinothioyl hydrazine having the formula:

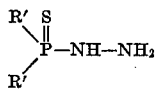

wherein R' has the hereinbefore assigned value, in a solvent which is essentially non-reactive under the conditions of the reaction, adding thereto while maintaining the temperature of the reaction mixture between 0 and 50° C., a dialkoxyphosphinothioyl halide having the formula:

wherein R has the hereinbefore assigned value, X is a halogen having an atomic number between 8 and 54, and, recovering therefrom 1 - bis(dialkylamino)phosphinothioyl-2-(dialkoxyphosphinothioyl)hydrazine.

References Cited in the file of this patent
UNITED STATES PATENTS
2,759,961    Fitch et al. _____ Aug. 21, 1956

OTHER REFERENCES
Melnikov et al.: J. Gen. Chem. U.S.S.R. 25, 793–795 (1955) (English translation).